(12) United States Patent
Hellkamp

(10) Patent No.: US 8,963,446 B2
(45) Date of Patent: Feb. 24, 2015

(54) DEVICES WITH A LEVEL LIGHT

(71) Applicant: Martin Edward Hellkamp, Roanoke, VA (US)

(72) Inventor: Martin Edward Hellkamp, Roanoke, VA (US)

( * ) Notice: Subject to any disclaimer, the term of this patent is extended or adjusted under 35 U.S.C. 154(b) by 196 days.

(21) Appl. No.: 13/691,652

(22) Filed: Nov. 30, 2012

(65) Prior Publication Data

US 2013/0329439 A1 Dec. 12, 2013

Related U.S. Application Data

(63) Continuation-in-part of application No. 13/537,002, filed on Jun. 28, 2012.

(60) Provisional application No. 61/502,827, filed on Jun. 29, 2011.

(51) Int. Cl.
| | | |
|---|---|---|
| H05B 37/02 | (2006.01) | |
| F21V 23/00 | (2006.01) | |
| B62J 1/00 | (2006.01) | |
| F21V 21/30 | (2006.01) | |
| F21V 23/04 | (2006.01) | |
| E04H 15/00 | (2006.01) | |
| A42B 3/04 | (2006.01) | |
| F21V 33/00 | (2006.01) | |
| F21V 21/08 | (2006.01) | |
| F21V 21/092 | (2006.01) | |
| F21V 21/096 | (2006.01) | |
| F21V 21/14 | (2006.01) | |
| F21Y 101/02 | (2006.01) | |

(52) U.S. Cl.
CPC ............... *F21V 23/003* (2013.01); *B62J 1/00* (2013.01); *F21V 21/30* (2013.01); *F21V 23/0492* (2013.01); *E04H 15/00* (2013.01); *A42B 3/044* (2013.01); *F21V 33/00* (2013.01); *F21V 21/0832* (2013.01); *F21V 21/092* (2013.01); *F21V 21/096* (2013.01); *F21V 21/145* (2013.01); *F21Y 2101/02* (2013.01)
USPC .......................................... 315/297; 315/307

(58) Field of Classification Search
CPC ....................................................... H05B 37/02
USPC .......................................... 315/294, 297, 307
See application file for complete search history.

(56) References Cited

U.S. PATENT DOCUMENTS

| | | | |
|---|---|---|---|
| 7,401,517 B2 * | 7/2008 | Pan et al. ................... | 73/504.16 |
| 8,350,486 B2 * | 1/2013 | Bucalo ....................... | 315/209 R |
| 2010/0125172 A1 * | 5/2010 | Jayaraj ....................... | 600/249 |
| 2012/0300439 A1 * | 11/2012 | Davis Hatfield et al. ..... | 362/183 |
| 2013/0014790 A1 * | 1/2013 | Van Gerpen ................ | 135/66 |
| 2013/0249435 A1 * | 9/2013 | Hellkamp ................... | 315/297 |

\* cited by examiner

*Primary Examiner* — Don Le
(74) *Attorney, Agent, or Firm* — Pike IP Law, PLLC; Bernard G. Pike

(57) ABSTRACT

A lighting apparatus having at least one set of light sources, a microprocessor, and an orientation sensor. The microprocessor and the orientation sensor are capable of maintaining the light source in a desired orientation. The lighting apparatus and devices having a lighting apparatus are capable of controlling the plurality of light sources to maintain the desired orientation of the lighting. The lighting apparatus may be connected to a device, such as a piece of wheeled luggage, stroller or hat, such that when the luggage is tilted the light source maintains an desired orientation relative to a fixed orientation, such as a horizontal orientation.

19 Claims, 4 Drawing Sheets

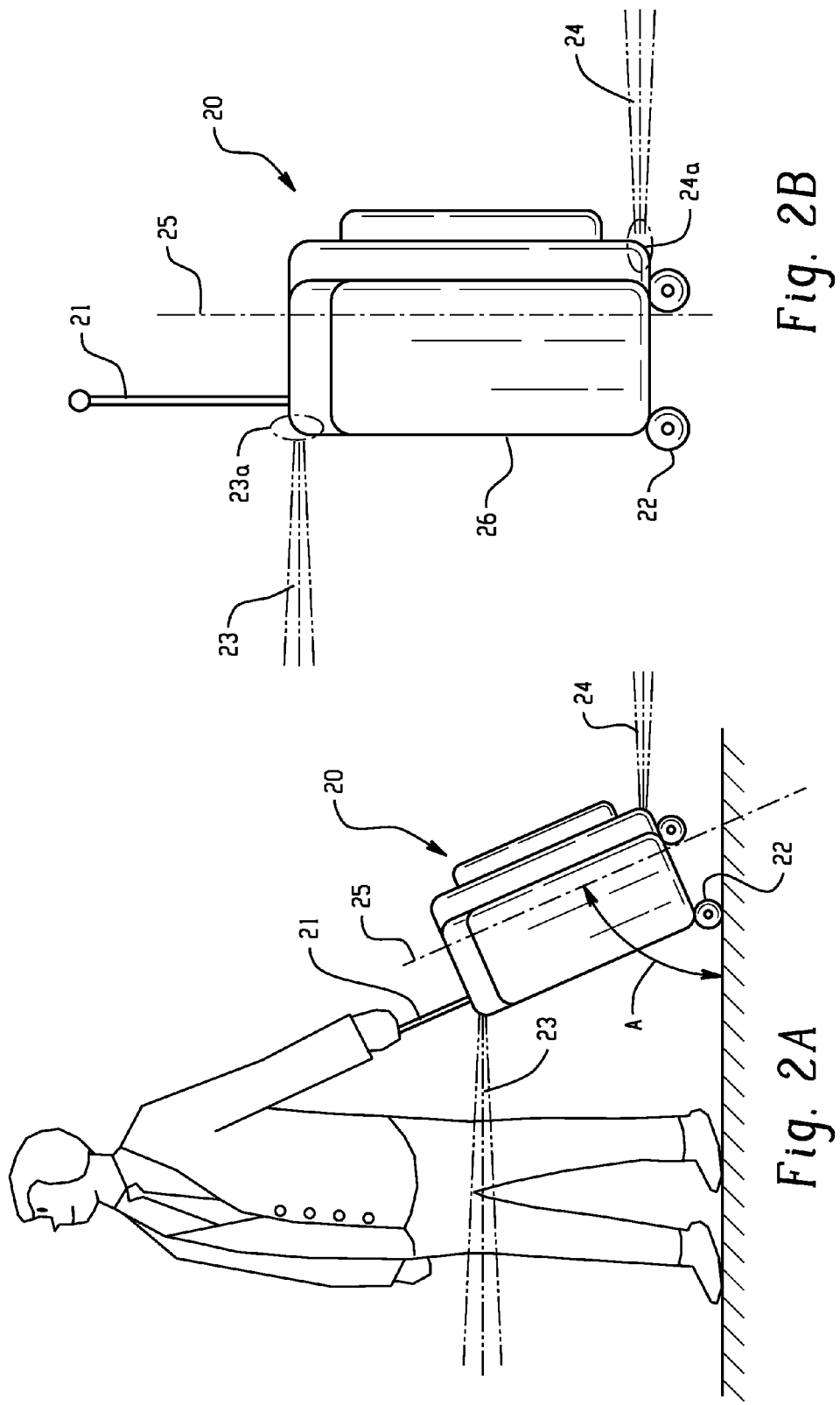

DEVICES WITH A LEVEL LIGHT

RELATED APPLICATIONS

This application claims priority under 35 U.S.C. 120 to U.S. patent application Ser. No. 13/537,002 filed on Jun. 28, 2012 which claims priority to U.S. Provisional Patent Application No. 61/502,827 filed on Jun. 29, 2011, which are both hereby incorporated by reference in their entirety.

TECHNICAL FIELD

Lighting apparatuses and light sources are used to illuminate areas. Certain devices incorporate light sources including directional light sources to provide light for the user of the device and/or to increase the visibility of the device to other persons. In specific embodiments, the lighting apparatus comprises a plurality of directional light sources, a processing unit, and an orientation sensor such as a gyroscope, wherein processing unit provides power to at least a portion of the plurality of light sources based upon the orientation of the orientation sensor.

BACKGROUND

Many types of portable lighting devices exist for illuminating objects while working with the hands, reading, walking, hiking or jogging. The most common example is the hand held flashlight; which is a self-contained lighting device powered by a portable power source, (i.e. battery, batteries, generator, capacitor or photovoltaic cell, for example), connected to a light source such as, for example, at least one bulb or light emitting diode ("LED"). These devices typically comprise a hand operated switch to turn electrically connect the power source to the light source. These portable lighting devices ("flashlights") are manufactured in many sizes, shapes and configurations for specific applications, including, but not limited to, lights mounted to flexible arms for reading, lights mounted to head bands for running and working in a hands free method; and the most common are the portable hand held models.

People understand the convenience of hands free operation of portable lighting devices and thus various methods of mounting these devices to objects have been developed to assist in hands free use. When bike riding, jogging, traveling or walking, it is generally desirable to be able to see the pathway in which you are traveling. Even though there may have some ambient light (street lights, parking lot lights, full moons, etc.), many people, for safety and peace of mind, may prefer to use additional lighting so they are both more visible to others and they have enhanced visibility ahead of themselves. There are at least two problems presented in carrying additional lighting, the problem of an light source appropriate for the desired activity being available and the problem of an appropriate light source being convenient for use. When walking through parking lots, to or from taxi stands or traveling (by air, train, bus, car, etc.) having a "flashlight" when you need one may be inconvenient; and in the event that you do have one available, it is not generally easy to carry and/or pull luggage, pull carts, strollers, wheel barrows, or ride on a bicycle or a tricycle while focusing a light in the direction of travel. This problem is especially amplified when both hands are needed to perform various activities such as but not limited to pulling a wheeled luggage, finding your keys and/or manipulating your keys, opening doors, or carrying two pieces of luggage, a purse, shopping bags, a briefcase, or another object and pulling wheeled luggage. In this modern day of hand held communication devices, it is also common for people to be pulling wheeled luggage with one hand while talking on the cell phone with the other. This makes carrying a conventional flashlight impractical.

There exists a need for a lighting apparatus that may be used conveniently while using your hands for a different activity such as pulling wheeled luggage. There further exists a need for a hands free lighting source that maintains the proper orientation without further manipulation by the user.

SUMMARY

Embodiments of the invention are directed to devices comprising lighting apparatuses. The lighting apparatus can adjust its light output based upon the orientation of the lighting apparatus or the orientation of the device comprising the lighting apparatus. The light output may be adjusted by altering at least one parameter of the light output. These parameters for light output include, but are not limited to, brightness, color, direction, consistency (consistency of the light output includes, but is not limited to, solid unchanging, blinking on/off, shimmering, twinkling, or changing colors of the light source output), ramping up or down, or a combination thereof, for example. For example, if the device is tilted from an original position, an orientation sensor in the device or lighting apparatus senses the change in orientation and communicates at least one orientation parameter to a processing unit. The processing unit interprets the lighting parameters based upon a set of programmed instructions and communicates with a plurality of lighting sources to set the parameters for each individual light sources or sets of light sources to modify the light output.

The device may be a hat, suit case, or stroller, for example. As used herein, the term "hat" includes, but is not limited to, baseball hat, visors, bicycle helmet, skiing helmet, horse riding helmet, ski helmet, hard hat, pith helmet, or other hat. As used herein, the term "suit case" includes luggage, wheeled luggage, wheeled golf travel cover, wheel trunk, duffel bag or other types of suit cases.

In some embodiments, the device or lighting apparatus may be programmable to control the plurality of light sources. The program may control and/or adjust any of the light output parameters of the light sources for each individual light source or sets of light sources. The lighting apparatus may be programmed to adjust the output of the lighting apparatus to maintain the light in substantially the original direction after the device or lighting apparatus is tilted from its original orientation. For example, as a wheeled piece of luggage is tilted from the upright position (shown in FIG. 2B) to tilted position (shown n FIG. 2A) for pulling on its wheels, the orientation sensor senses the change in orientation of the luggage versus the horizon and the processing unit outputs commands to turn off certain light sources and energize other light sources that are now directed in the original direction to maintain the light in the original horizontal direction.

An embodiment of a lighting apparatus may comprise multiple lighting sources, and a central processing unit controlling each of the multiple lighting sources or sets of multiple light sources. The processing unit may be in electrical communication with an orientation sensor. The orientation sensor monitors the orientation of the device and/or the lighting apparatus and the processing unit selectively powers at least a portion of the light sources based upon the output of the orientation sensor. The processing unit may comprise the orientation sensor, such as a computer chip with an integrated electronic gyro, for example. In one embodiment, the electronic gyro senses a change in orientation of the lighting apparatus and/or device and activates a different set of light sources to maintain the light in a desired direction such as, for example, horizontal.

In some embodiments, the lighting apparatus may comprise multiple light sources such as a first light source and a second light source. In other embodiments, the lighting source may comprise a plurality of light sources, such as two or more sets of light sources. Each set of light sources may comprise any number of light sources, from 2 to 10 individual light sources in each set, for example. Each light source or set of light sources may comprise its own power circuit including power source, wiring, controller, and switches or may share any or all of these components. In some embodiments, a portion of the light sources may be fixed light sources that stay on independent of the orientation parameters.

The processor may be connected to circuits for illuminating a particular portion of the light sources or sets of light sources in response to the orientation of the lighting apparatus. The processor may further activate a servo motor that adjusts the location of the light source based upon the orientation of the lighting apparatus. For example, a gyroscope may sense that the lighting apparatus has tilted and rotate the light source in an opposite direction for substantially the same distance so that the light is shining in substantially the same direction. In embodiments of the lighting apparatus comprising a plurality of light sources or sets of light sources, the processing unit may deactivate light source or set of light sources and activate a different light source or set of light sources based upon a change in orientation of the lighting apparatus when compared to the horizontal. The processing unit may be programmable to allow the modification of the direction of light or other parameter for light output based upon the orientation of the lighting apparatus. For example, the processor may be programmed to maintain lighting in a forward horizontal direction or in a forward horizontal direction and a rearward horizontal direction or in a forward horizontal direction, in a rearward horizontal direction and in a forward downward direction, such as a 45° downward direction versus the horizontal. The processing unit may also be programmed to incorporate a time delay in deactivating or activating a portion of the light sources.

Other aspects and features of embodiments of the devices or lighting apparatuses comprising at least light source and a leveling mechanism will become apparent to those of ordinary skill in the art, upon reviewing the following description of specific, exemplary embodiments of the present invention in concert with the figures. While features may be discussed relative to certain embodiments and figures, all embodiments can include one or more of the features discussed herein. While one or more particular embodiments may be discussed herein as having certain advantageous features, each of such features may also be integrated into various other of the embodiments of the invention (except to the extent that such integration is incompatible with other features thereof) discussed herein. In similar fashion, while exemplary embodiments may be discussed below as system or method embodiments it is to be understood that such exemplary embodiments can be implemented in various systems and methods.

BRIEF DESCRIPTION OF THE DRAWINGS

FIG. 2A depicts an embodiment of a piece of wheeled luggage with a two sets of light sources, wherein each set of light sources may be controlled by a central processing unit and an orientation sensor to maintain the direction of the light in a substantially horizontal position and an angle to a longitudinal axis of the luggage;

FIG. 2B depicts the embodiment of the piece of wheeled luggage of FIG. 2A in an upright position wherein each set of light sources is controlled by a central processing unit and an orientation sensor to maintain the direction of the light in a substantially horizontal position and substantially perpendicular to the longitudinal axis of the luggage;

DESCRIPTION OF EMBODIMENTS

Figure 1:
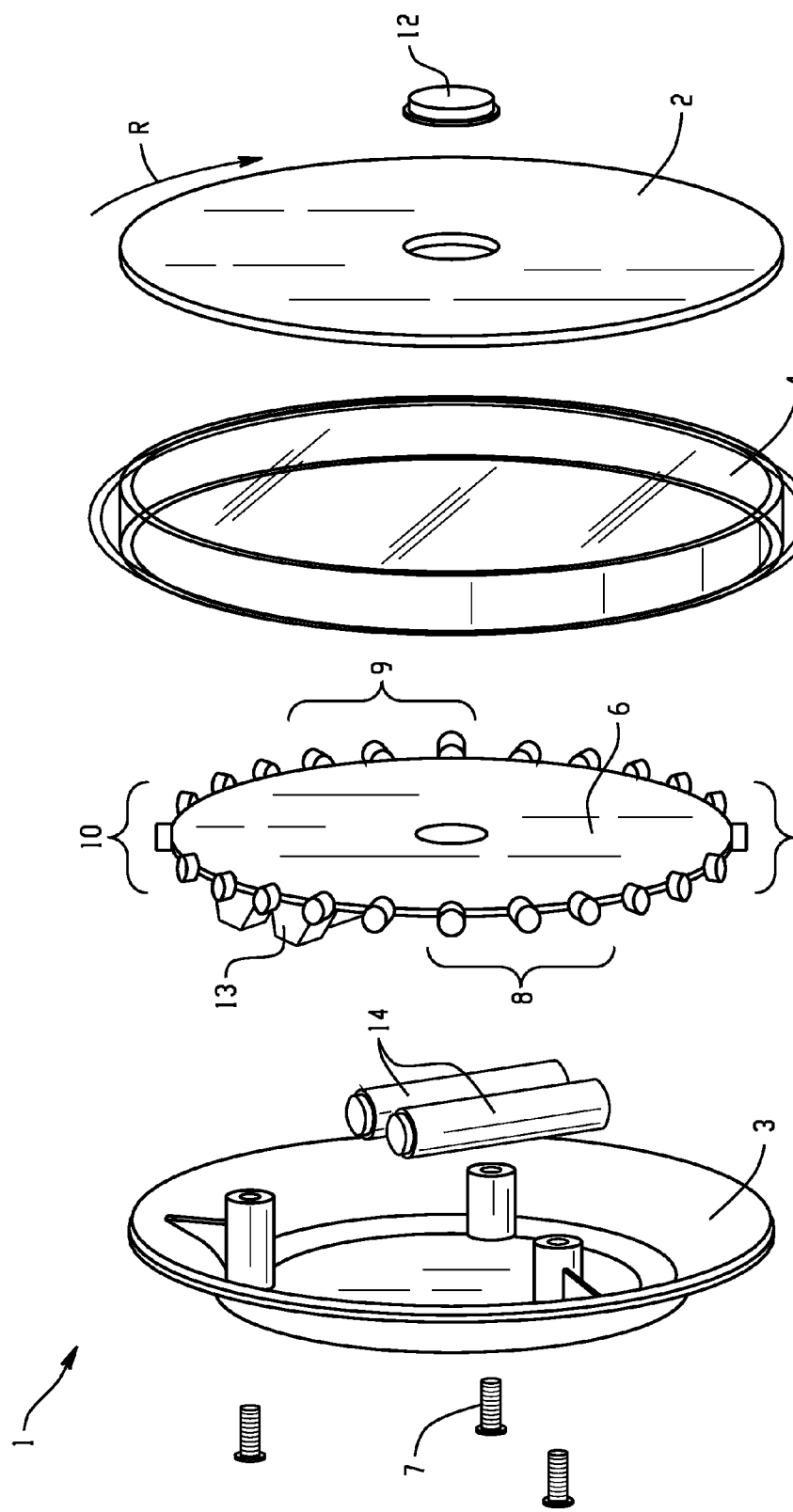
FIG. 1 depicts an exploded view of a lighting apparatus.

Embodiments of the lighting apparatus provide a hands free operation and simple solution to mount or incorporate a light source onto a device. A conventional flashlight may be mounted to the side of a piece of luggage with tape or a strip of Velcro attached to the flashlight and then simply pulled it off and stored in the luggage when not in use. This solution of a luggage mounted flashlight is simple and yet effective hands free method to light the path in front of you while you walk carrying or pulling luggage. However, this method of lighting is flawed. As a user walks with a piece of luggage that has a flashlight or other directional light source fixedly attached to their luggage, the angle relative to the horizon in which the light shines changes as the angle of the object being carried or pulling changes. Specifically, the relative angle between the luggage and the flashlight is fixed and therefore does not change as the luggage is tilted for rolling on its wheels. For instance, when you first pull out the handle on a wheeled piece of luggage, the luggage is typically in an upright vertical position. If a flashlight was attached to shine horizontally with the luggage in the upright vertical position, the light would, when turned on, be directed to shine horizontally. However, once the handle is extended and the luggage is tilted so that the wheels in the front or bottom of the luggage support the weight of the luggage, the light would be directed toward the ground necessitating readjustment of the directional light source for rolling and sitting. While the ability to travel and utilize the design of wheeled luggage is enhanced, if a lighting device is attached to the side of the luggage, the light shines in a non-horizontal angle or direction when the luggage is tilted for pulling. In fact, if mounted parallel to the ground (the typical direction that an individual would want a light to shine while walking), as soon as a person would start walking, the light would now shine at an angle off horizontal equal to the angle of the object it was mounted has changed. For instance if the luggage was tilted forward, the light would now shine at an angle less than ideal to illuminate a directional path in front of the user. Because luggage comes in a variety of sizes, height, handle lengths, and shapes; the angle that a particular people will tilt a particular piece of luggage is different based upon, among other things, their height, arm length and comfort; this is further complicated by the type and slope of terrain, finding a fixed angle for mounting a flashlight on a piece of luggage that would work in all cases is difficult, if not impossible. Even then, the flashlight would be directed in an upward angle when the luggage is returned to the untilted, upright position or being carried by the handle.

Embodiments of the lighting apparatus provide a solution to the problem of the keeping the light shining horizontally (or other desired angle) when a device or object in which that lighting apparatus is attached to or incorporated into is tilted. The device may be, but is not limited to, a piece of luggage, stroller, bicycle, tricycle, wheel barrow, or hat, for example.

Embodiments of the lighting apparatus and/or devices may comprise a plurality of light sources and at least one orientation or tilt sensor ("orientation sensor"). Such embodiments comprising an orientation sensor may utilize a processor, digital processing unit, or microcontroller ("processor") in communication with a plurality of light sources to maintain light shining in the desired direction or directions. Typical processors comprise several general purpose input/output pins (GPIO). GPIO pins may be software configurable to either an input or an output state. When GPIO pins are configured to an input state, they are often used to read sensors or external signals such as from the orientation sensor; configured to the output state, GPIO pins can drive or activate external devices such as the light sources, LEDs, for example. In certain embodiments, the processor maintains the desired light direction by illuminating the light sources that are directed in the proper orientation to maintain the desired light direction or light directions and deactivating the light sources that are not in the proper orientation. The processor may additionally control other light output parameters.

As such, the electronic mechanism may comprise a processor that activates at least a portion of the lights based upon an orientation parameter output from the gyro chip. The processor may be programmable or have a static memory comprising the desired lighting coordinates and/or light output parameters. If programmable, the processor may be programmed to activate at least a portion of the light sources based upon the orientation parameters output from the orientation sensor. As the orientation parameters change, the processor may respond by changing which light sources are illuminated and the other light output parameters. The orientation parameters output from the orientation sensor and received by the processor may include one or more of x, y, and z coordinates; tilt, yaw and roll; one or more of x, y, and z coordinates as compared to a referenced direction; an angular velocity or degree of rotation; or the difference between current and previous x, y and z components. In a specific embodiment, the orientation parameters indicate the change in orientation of the lighting apparatus relative to a horizontal position.

For example, the orientation sensor may comprise at least one gyroscope chip and/or at least one accelerometer including, but not limited to, a linear accelerometer, a combination of a gyroscope chip and an accelerometer or an inertial measurement unit, for example. Determining the tilt of an object by use of linear accelerometers is described in "*Tilt Sensing Using Linear Accelerometers*" available from Freescale Semiconductor, Document Number: AN3461 Rev. 4, 2/2012 (available at http://www.freescale.com/files/sensors/doc/app_note/AN3461.pdf), which is hereby incorporated by reference. A gyroscope chip may also be used to determine the orientation parameters. Determining the tilt or angular velocity of an object by use of gyroscope chip is described at http://www.starlino.com/imu_guide.html, which is hereby incorporated by reference. Accelerometers and gyroscope chips are readily commercially available with the appropriate wiring diagrams.

The processor may be programmable to simply rely on the programmed x and y or rotational coordinates in which a particular light source may be switched to the ON position ("activated"). In this embodiment, any one light source or set of light sources mounted in an array around the circumference of a housing mechanism would be illuminated when the desired direction is obtained.

An embodiment of a lighting apparatus is shown in FIG. 1. The lighting apparatus 1 comprises a housing including a first side housing 2, a second housing 3 and a lens 4. In this embodiment, the lens 4 is a cylindrical 360 degree lens. The lighting apparatus further comprises a printed circuit board 6. The printed circuit board 6 has a plurality of LEDs including 8 9 10 and 11, a processor (not shown), an orientation sensor (not shown), and a battery housing 13 connected thereto. Batteries 14 are placed in the battery housing 13 to provide electrical power to the processor, orientation sensor, LEDs and other electrical components of the lighting apparatus. The printed circuit board 6 may have further components connected thereto as required to properly operate the electrical circuits such as resistors, diodes, and other components as understood by one skilled in the art. The first housing 2, second housing 3 may be connected together by connectors, for example, screws 7. Other connectors may be used such as, but not limited to, adhesives, rivets, snap fit connectors, interference fit connectors, or other combinations thereof.

The lighting apparatus may further comprise an ON/OFF button 12 that engages a switch on the printed circuit board 6 to activate and deactivate the device. Other embodiments of the lighting apparatus may comprise multiple printed circuit boards or other support elements for attaching the various components. For example, the plurality of light sources may be on multiple printed circuit boards in remote locations (See FIG. 2) and the control circuit may be in still a further convenient location or connected to either of the printed circuit boards with one set of light sources.

Figure 4:
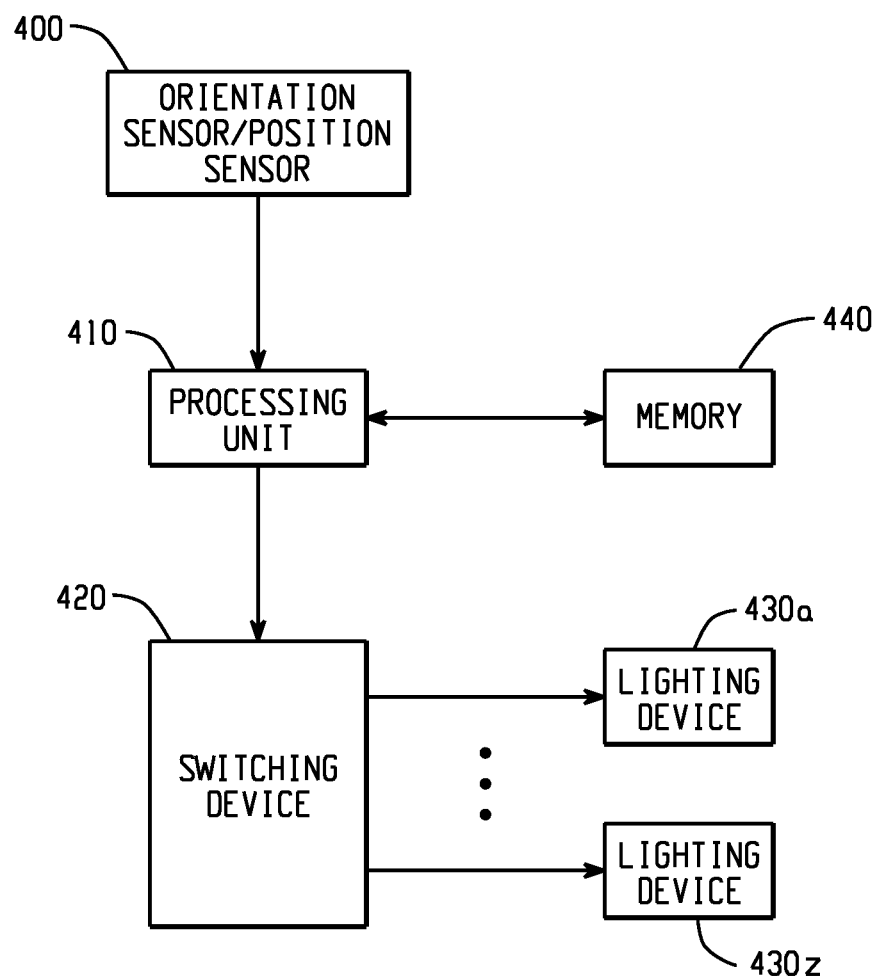
FIG. 4 depicts a schematic of the components of the lighting apparatus.

The operation of the lighting apparatus may be described in reference to FIG. 1 and FIG. 4. For example, the lighting apparatus 1 may be programmed to shine light in both forward and rearward horizontal directions. Thus in the position shown, the orientation sensor 400 provides current orientation parameters to the processor 410. The processing unit 410 may be programmed to store the current orientation parameters in memory or compare the current orientation parameters with previous or other stored orientation parameters. The processing unit 410 may directly operate the appropriate light sources or may send instruction to a switching device 420 to operate the appropriate light sources 430*a* to 30*z* to maintain the desired directional lighting. In reference to lighting apparatus of FIG. 1 in its current position and being programmed to project light in both the forward and rearward horizontal directions, the processor based upon the orientation parameters from the orientation sensor activates two sets of LEDs 8 and 9. Set of LEDs 8 direct light in the forward direction and set of LEDs 9 direct light in a rearward direction. If the lighting apparatus 1 is rotated 90° in clockwise direction shown by arrow R, the orientation sensor 400 will sense the rotation and/or the new position of the lighting apparatus 1 and output new orientation parameters to the processor 410. Based upon the new orientation parameter of a 90° clockwise rotation from the position shown in FIG. 1, the processor activates two different sets of LEDs according to the program. In this case, set of LEDs 10 is now in the rearward direction and set of LEDs 11 have rotated into the forward direction. The previously activated sets of LEDs 8 and 9 are now in the vertical direction and are currently deactivated after the 90° clockwise rotation.

An embodiment of a piece of wheeled luggage 20 comprising a lighting apparatus is shown in FIG. 2A. The wheeled luggage 20 comprises a handle 21 and wheels 22 to facilitate rolling the piece of wheeled luggage 20 rather than having to carry the full weight of the luggage and its contents. The handle 21 is typically an extendable handle that may be extracted from a compartment in the luggage 20 to facilitate rolling and retracted back in the compartment to facilitate storage and transport. The luggage 20 may be tilted forward onto wheels 22 changing the angle A from the standing position (shown in FIG. 2B) between the longitudinal axis 25 and the horizon.

Figure 2C:
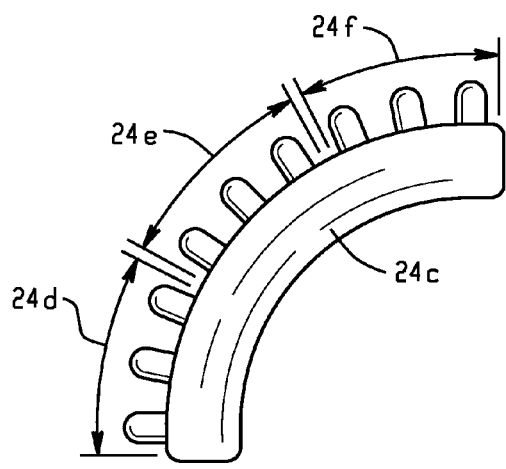
FIG. 2C depicts an embodiment of a set of light sources for incorporation into the top front portion of the piece of wheeled luggage shown in FIGS. 2A and 2B.
Figure 2D:
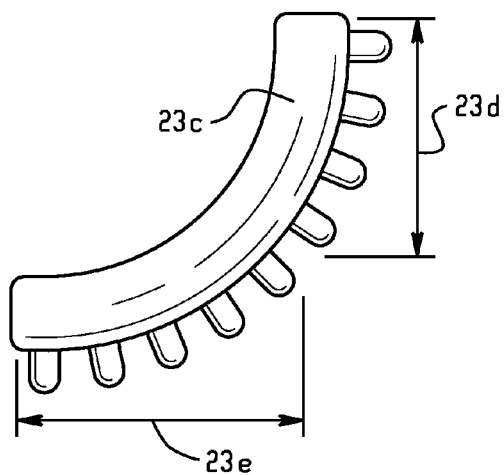
FIG. 2D depicts an embodiment of a set of light sources for incorporation into the bottom rear portion of the piece of wheeled luggage shown in FIGS. 2A and 2B.

In this embodiment, the wheeled luggage 20 comprises two separate lighting sources, a forward facing lighting apparatus 23*a* providing a substantially horizontal beam of the light 23 and a rearward facing lighting apparatus 24*a* providing a substantially horizontal beam of light 24. Each lighting apparatus may comprise its own power source, processor, and/or orientation sensor or the same power source, processor, and/or orientation sensor may operate both lighting apparatuses 23*a* and 24*a*. Each lighting apparatus comprises a plurality of light sources or sets of light sources. In this embodiment, the light sources, LEDs, are evenly distributed around an edge of a printed circuit board. FIG. 2C depicts an example of a lighting apparatus that is suitable as a component of the forward facing lighting apparatus 23*a*. The lighting apparatus of FIG. 2C comprises a printed circuit board 24*c* with a plurality of light sources 24*d*, 24*e* and 24*f* electrically connected thereto. FIG. 2D depicts an example of a lighting apparatus that is suitable as a component of the rearward facing lighting apparatus 24*a*. The lighting apparatus of FIG. 2D comprises a printed circuit board 23*c* with a plurality of light sources 23*d* and 24*e* electrically connected thereto. Generally and merely for illustration, the various sets of light sources may be activated when the luggage 20 is in various positions. For example, when the luggage 20 is in the upright standing position as shown in FIG. 2B, set of lighting sources 24*d* on the forward facing lighting apparatus 23 and set of lighting sources 23*d* on the rearward facing lighting apparatus may be activated to shine light in a horizontal orientation in both the forward and rearward directions. When the wheeled luggage 20 is tilted into the rolling position as shown in FIG. 2A and the angle A changes from the position in FIG. 2B, set of lighting sources 24*e* on the forward facing lighting apparatus 23 and set of lighting sources 23*e* on the rearward facing lighting apparatus may be activated to continue to shine light in a horizontal orientation in both the forward and rearward directions. The processor may be programmed to provide a progression of light changes such that as the wheeled luggage is being tilted, some lights sources from both sets of light sources 24*d* and 24*e* are activated. Further, set of light sources 2*f* may be activated when the wheeled luggage 20 is rested on its forward panel 26, for example.

Figure 3A:
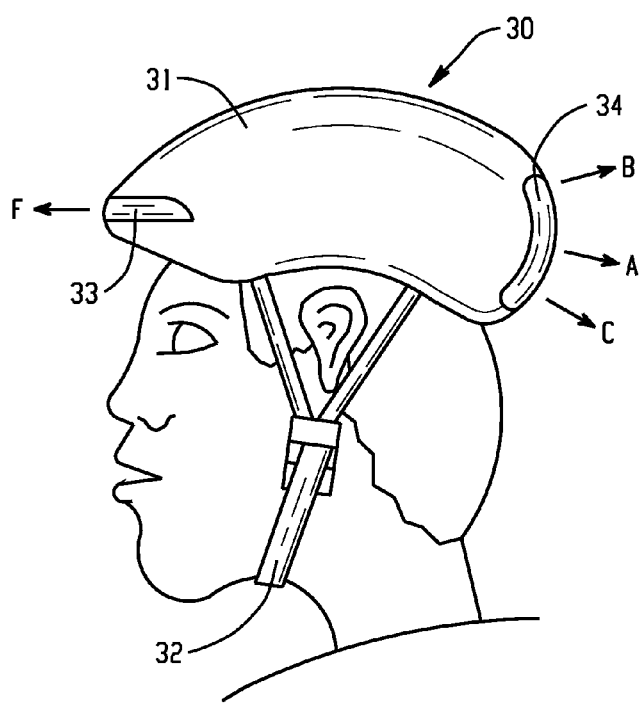
FIG. 3A depicts a bicycle helmet comprising a forward facing light source and a rearward facing light source, wherein the forward facing light source is a fixed light source and the rearward facing light source is controlled by an orientation sensor and a processing unit to maintain the light in a horizontal direction.
Figure 3B:
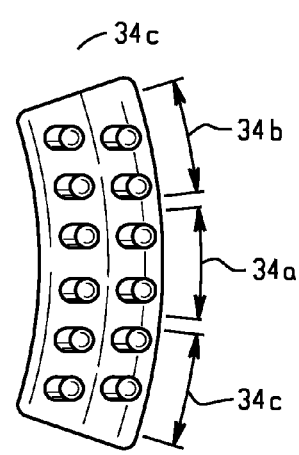
FIG. 3B depicts an embodiment of the rearward facing light source of the bicycle helmet of FIG. 3A.

FIG. 3A depicts another embodiment of a device comprising a lighting apparatus. The device in this embodiment is a bicycle helmet 30. The bicycle helmet 30 comprises a head protective portion 31 and a chin strap 32. The embodiment of the helmet 30 further comprises a forward facing lighting apparatus 33 and a rearward facing lighting apparatus. The forward facing lighting apparatus 33 is a unidirectional lighting device so that the light shines in the direction that the wearer is looking, thus illuminating a substantial portion of their field of view. The rearward facing lighting apparatus 34 comprises red light sources or a red lens to project a red light to the rear of the rider. The rearward facing red lighting apparatus 34 provides visibility to the wearer from behind such as by drivers approaching a bicycle rider wearing the helmet. The rearward facing rear lighting apparatus is controlled by an orientation sensor such that the light beam remains substantially horizontal as the wearer moves their head. An embodiment of an appropriate printed circuit board 34*c* is shown in FIG. 3B. The printed circuit board comprises a plurality of LEDs 34*a*, 34*b* and 34*c*. For example, the rearward facing lighting apparatus 34 will typically shine light in the horizontal direction from a central set of light sources 34*a* in direction A if the wearer is looking forward as they ride their bicycle. If the wearer looks down to check the road, a speedometer or other meter on their handlebars, the orientation sensor senses the change and then projects the light from a set of light source 34*c* in direction C which would be horizontal when the wearer is looking down. Similarly, if the wearer looks up, the orientation sensor senses the change and then projects the light from a set of light source 34*b* in direction B which would be horizontal when a wearer of the helmet is looking up. In other embodiments, the forward facing light may include a light sources controlled by an orientation sensor ("level light") and processor or be a combination of a unidirectional light source and a level light.

A schematic of the design of an embodiment of a lighting apparatus is shown in FIG. 4. The processor 410 of lighting apparatus may be a programmable processing unit or a processing unit with a static memory. The processor 410 activates at least a portion of the light sources 430*a* to 430*z* based upon orientation of the lighting apparatus as determined from the orientation parameters received from the orientation sensor 400. The processor 410 may be programmed to activate the forward facing light sources and rearward facing light sources along the horizontal. If the lighting apparatus is rotated or tilted through the x,y plane, the orientation sensor 400 of lighting apparatus is capable of determining the new orientation of the lighting apparatus compared to the horizontal (or other reference orientation) and determines the current orientation parameters. The orientation sensor 400 then communicates the orientation parameters to the processor 410. The processor 410 interprets the orientation parameters and compares them to the desired light orientation information in the memory of the processor 410 and determines whether a different light source or set of light sources 430*a* to 430*z* should be activated. The light sources are numbered 430*a* to 430*z* to indicate only that there is more than one light source and does not limit the number of light sources that may be incorporated into the lighting apparatus.

Additional embodiments of the device comprising embodiments of the lighting apparatus include strollers, boats, hats, for example. For example, a boat may comprise a lighting apparatus on the starboard side with a red light and a lighting apparatus with a green light on the port side with a white beam in the forward facing light being in front of both. The lights can be mounted on the side rails or incorporated as a single bow light. The lights will always project in the horizontal direction even as the boat rocks in the waves. Therefore, the lights will remain constant to other boats rather than appearing to flash as the light points in different directions as the boat rocks in the waves.

In another example, the lighting apparatus is designed to maintain a forward shining white light and a rearward shining red light. The processor correspondingly has activated forward light sources and rearward light sources. If the lighting apparatus is rotated approximately thirty degrees in the counter clockwise direction through the plane x,y, the orientation sensor will sense the angular rotation and/or change in orientation of the lighting apparatus and send new orientation parameters to the processor. Processor may then activate the currently forward facing light sources and currently rearward facing light sources after or during rotation or tilting. The process is automatically reversed after a subsequent clockwise rotation. Each of the individual light sources or sets of light sources are individually in electrical communication with a power source and the processor is capable of individually activating the appropriate light sources or sets of light sources based upon the orientation parameters from the orientation sensor. As such, embodiments of the lighting apparatus may incorporate a design that comprises an array of LED lights mounted in a cylindrical housing that are switched on by a processor and an electronic gyro when the programmed direction of the gyro (in this example horizontal) is achieved.

The housing of the lighting apparatus may be any other desired shape such as, but not limited to, cylindrical, spherical, tubular with rounded ends, or egg shaped, for example.

The gyroscope on the gyroscope chip may be one of a piezoelectric gyroscope, a vibrating wheel gyroscope, a tuning fork gyroscope, a hemispherical resonator gyroscope, or a rotating wheel gyroscope, for example. Orientation sensors are available There are many uses of the lighting apparatuses describe herein. Embodiments of the lighting apparatuses provide a forward shining horizontal light beam and a rearward shining amber glow of light that when attached to object that will change angles during use (a pulled wheel aboard piece of luggage, a carried tote, etc.) will maintain the light shining in a substantially stable position. For example, as the object changes angles, the invention maintains a horizontal beam of light in the front with a warning or indicator light shining from behind. Additionally, the light apparatus could easily be mounted to head gear worn by children and adults in such activities as biking, skate boarding or anything requiring the use of a helmet. The light apparatus can also be mounted (with a simple piece of Velcro) to the side of a runner or walker's clothes and thus giving the same results as an automobile with headlights. The lights can also be used in tents, camp sites, and vehicles.

Embodiments of the lighting apparatus comprise a connector for attaching a light to an object so that a desired direction such as, but not limited to, horizontal, of the directional light beam is maintained no matter how the angle of the object is changed relative to the horizontal, the orientation sensor and the processing unit control individual light sources and/or sets of light sources to adjust or maintain the angle of the directed beam of light.

Further embodiments of the lighting apparatus may comprise a second light source. The second light may be directed in the same or different direction than the first light source. In addition to having the added advantage of a substantially consistent horizontal beam of light attached to an object; embodiments of the lighting apparatus may comprise a rearward directed light. The lighting apparatus may comprise a forward directed light and a rearward directed light, for example. The lights may be of the same or different color. The forward directed light may be a white light and the rearward directed light may be a red or amber light, for example. Such color combinations are used to conventionally to indicate the direction a person or object having the light is facing or traveling. Other light color combinations could also be used. By adding a red LED to the opposite end of a barrel light that produces the forward shining white light, the device now illuminates a consistently horizontal red light that may be seen from the behind the user. This design feature allows the user to be more easily seen from behind by others such as drivers in automobiles, other walkers, bikers, or runners etc; providing a built in safety feature similar to the running lights of a car.

Using embodiments of the lighting apparatus, someone walking on the street or walking from an airport to their car can attach a consistently horizontal light source to the side of their luggage and not only see what is front of them but will also be seen by others from behind. A person walking from the grocery store to their car at night can attach the level lights to the side of the grocery cart and more readily see and be seen by others. A runner running at night can now have a level light attached to or incorporated into their hat, sweat band or hip and have a constant horizontal beam in front of them and a red and/or amber indicator light that can be seen from behind. Additionally, a boater trying to dock in moving water could have a steady light source shining on a fixed object like a dock even though the waves are moving the boat up and down. Either of the light sources may be a blinking light source or comprise a switch that converts a constant beam to a blinking or flashing beam of light.

The lighting apparatus to be either permanently or removably connected to an object. As used herein, "removably connected" means that the lighting apparatus is connected to the object that may be removed by a typical consumer such as a by a hook and loop connector, friction connection, a bolt, thumb screw or wing nut, or other connector that does not require special tools or skills to remove and in not a more permanent connectors such as rivets or permanent glue.

The embodiments of the described methods and lighting apparatuses are not limited to the particular embodiments, components, method steps, and materials disclosed herein as such components, process steps, and materials may vary. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

The invention claimed is:

1. A lighted device, comprising:
   a first lighting apparatus comprising a plurality of a first light sources;
   a power source;
   an orientation sensor indicating the orientation of the first lighting apparatus; and
   a processing module in communication with the orientation sensor and capable of selectively activating at least a portion of the plurality of first light sources directed in a desired direction and deactivating one of a different light source or a different of set of light sources of the first lighting apparatus that are directed in a different direction than the desired direction based upon an output of the orientation sensor.

2. The lighted device of claim 1, wherein the orientation sensor is an integrated circuit.

3. The lighted device of claim 2, wherein the orientation sensor comprises a gyroscope circuit that generates at least one orientation parameter based upon the orientation of the sensor relative to a horizontal orientation.

4. The lighted device of claim 3, wherein the processing module is in electrical communication with the gyroscope circuit to receive the at least one orientation parameter.

5. The lighted device of claim 3, further comprising a second lighting apparatus.

6. A lighted device, comprising:
 a first lighting apparatus comprising a plurality of a first light sources;
 a second lighting apparatus comprising a plurality of second light sources;
 a power source
 an orientation senor; and
 a processing module in communication with the orientation sensor and capable of selectively activating the plurality of light sources based upon an output of the orientation sensor, wherein the processing module is capable of selectively activating the plurality of second light sources based upon an output of the orientation sensor.

7. The lighted device of claim 6, wherein the first light sources and the second light sources are directional light sources and at least a portion of the directional light sources direct light in different directions.

8. The lighted device of claim 7, wherein the device is a piece of wheeled luggage, and the wheeled luggage comprises a top front portion and a rear bottom portion, and the plurality of first light sources is on the top front portion and the plurality of second light sources is on the rear bottom portion.

9. The lighted device of claim 1, wherein the device is one of a piece of luggage, a piece of wheeled luggage, a hat, a stroller, a helmet, or a boat.

10. A hat or helmet, comprising:
 a plurality of directional light sources on a rear side of the hat or helmet, wherein the plurality of directional light sources comprise a first light source pointing in a first direction and a second light source pointing in a second direction;
 a power source;
 an orientation sensor; and
 a processor in communication with the orientation sensor and capable of selectively activating the directional light sources based upon an output of the orientation sensor, wherein the first direction is different than the second direction and one of the first direction and the second direction is at a different angle than a horizontal direction.

11. The hat or helmet of claim 10, wherein a first portion of the plurality of the directional light sources point in a first direction and a second portion of the plurality of the directional light sources point in a second direction.

12. The hat or helmet of claim 10, wherein the first direction and the second direction are radially different directions.

13. The hat or helmet of claim 10, comprising a light source on the front of the hat.

14. The hat or helmet of claim 10, wherein the plurality of directional light sources are arranged along a portion of curve.

15. The hat or helmet of claim 10, wherein the orientation sensor is an integrated circuit.

16. The hat or helmet of claim 10, wherein the orientation sensor comprises a gyroscope circuit that generates an orientation parameter based the orientation of the sensor compared to a horizontal position.

17. The hat or helmet of claim 16, wherein the gyroscope circuit comprises at least one of a piezoelectric gyroscope, a vibrating wheel gyroscope, a tuning fork gyroscope, a hemispherical resonator gyroscope, or a rotating wheel gyroscope.

18. The hat or helmet of claim 10, wherein the processor activates a first portion of the plurality of directional light sources including the first light source and deactivates a second portion of the plurality of light sources including the second light source based upon difference between a previous value of the orientation parameter and a current value of the orientation parameter.

19. The lighted device of claim 6, wherein the orientation sensor comprises a gyroscope circuit that generates at least one orientation parameter based upon the orientation of the sensor relative to a horizontal orientation.

\* \* \* \* \*